(12) United States Patent
McKee et al.

(10) Patent No.: US 9,246,613 B2
(45) Date of Patent: Jan. 26, 2016

(54) METHOD AND APPARATUS FOR PROVIDING ONLINE SOCIAL NETWORKING FOR TELEVISION VIEWING

(75) Inventors: Martin W. McKee, Herndon, VA (US); Paul T. Schultz, Colorado Springs, CO (US); Robert A. Sartini, Colorado Springs, CO (US); Hubert Sieh, Reston, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1155 days.

(21) Appl. No.: 12/124,020

(22) Filed: May 20, 2008

(65) Prior Publication Data

US 2009/0293079 A1 Nov. 26, 2009

(51) Int. Cl.
| | |
|---|---|
| H04N 5/445 | (2011.01) |
| H04H 60/80 | (2008.01) |
| G06Q 10/10 | (2012.01) |
| G06Q 50/00 | (2012.01) |
| H04N 21/475 | (2011.01) |
| H04N 21/4788 | (2011.01) |
| H04L 12/58 | (2006.01) |
| H04H 60/33 | (2008.01) |
| H04H 60/65 | (2008.01) |

(52) U.S. Cl.
CPC ............. *H04H 60/80* (2013.01); *G06Q 10/105* (2013.01); *G06Q 50/01* (2013.01); *H04L 12/588* (2013.01); *H04N 21/4756* (2013.01); *H04N 21/4788* (2013.01); *H04H 60/33* (2013.01); *H04H 60/65* (2013.01)

(58) Field of Classification Search
USPC ...................................................... 725/39–61
See application file for complete search history.

(56) References Cited

U.S. PATENT DOCUMENTS

| | | | | |
|---|---|---|---|---|
| 6,005,597 | A * | 12/1999 | Barrett et al. ................... 725/46 |
| 7,373,652 | B1 * | 5/2008 | Bayrakeri et al. ............... 725/53 |
| 2004/0098754 | A1 * | 5/2004 | Vella et al. ...................... 725/135 |
| 2004/0231003 | A1 * | 11/2004 | Cooper et al. ................. 725/135 |
| 2005/0005014 | A1 * | 1/2005 | Holmes et al. ................. 709/227 |
| 2007/0169148 | A1 * | 7/2007 | Oddo et al. ...................... 725/46 |
| 2007/0186243 | A1 * | 8/2007 | Pettit et al. ....................... 725/46 |
| 2008/0196055 | A1 * | 8/2008 | Sandoval et al. ................ 725/25 |
| 2008/0276279 | A1 * | 11/2008 | Gossweiler et al. ............. 725/46 |
| 2009/0043843 | A1 * | 2/2009 | Milewski et al. ............. 709/204 |
| 2009/0165030 | A1 * | 6/2009 | Cronin ............................ 725/14 |

* cited by examiner

*Primary Examiner* — Nicholas Corbo

(57) ABSTRACT

An approach is provided for extending social networking to television viewing. A community of a plurality of users is created, wherein each user is logged in a device configured to present audio-video content. Presence information of one of the users in the community is determined and transmitted to a corresponding device of another one of the users.

26 Claims, 14 Drawing Sheets

METHOD AND APPARATUS FOR PROVIDING ONLINE SOCIAL NETWORKING FOR TELEVISION VIEWING

BACKGROUND INFORMATION

Traditionally, the television has been the most widely used entertainment and information device for most people. Today, however, Internet use is gaining popularity over television especially among younger people, as computers, interactive electronic communications, and the Internet become integral components of daily life. At the same time, television programming choices have expanded tremendously. A viewer may have hundreds of television programs from which to choose at any given time of the day. The vast number of programming choices paradoxically makes it more difficult for viewers to find programs that they might enjoy. Viewers can look to their friends for recommendations, but the number of programming choices could easily overwhelm any manual process for receiving programming recommendations.

Therefore, there is a need for an approach that enhances the television experience to provide a more interactive and community-based experience for viewers.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing online social networking for television viewing are described.

In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
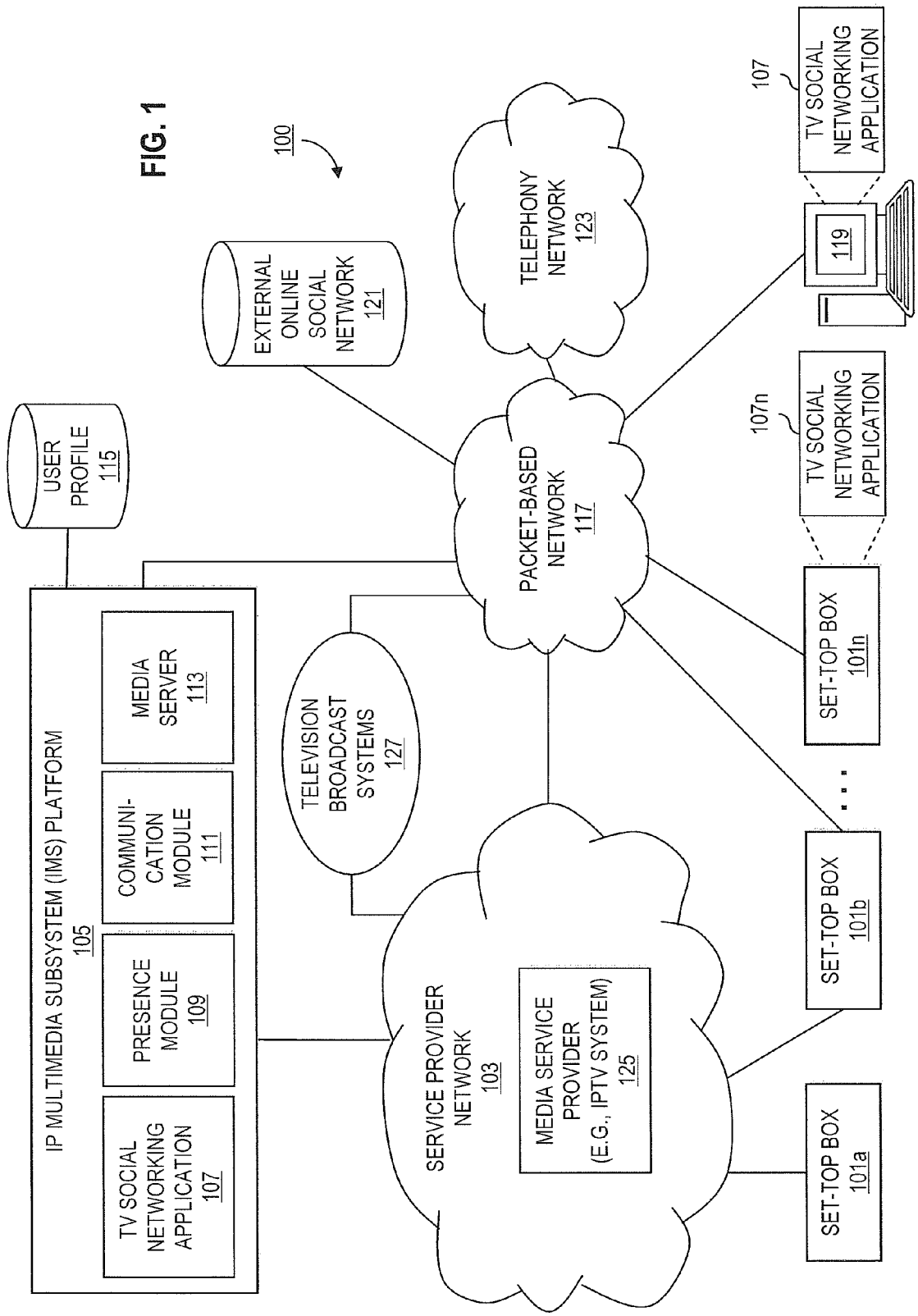
FIG. 1 is a diagram of a system capable of providing online social networking for television viewing, according to an exemplary embodiment.

FIG. 1 is a diagram of a system capable of providing online social networking for television viewing, according to an exemplary embodiment. For the purposes of illustration, a system 100 for online social networking is described with respect to a service provider network 103 including one or more media service providers 125. It is contemplated that system 100 may embody many forms and include multiple and/or alternative components and facilities. As used herein, the terms media-based device, STB, and user equipment are interchangeable. Furthermore, television content is contemplated broadly to include a wide range of media. Television content can include any AV content (e.g., broadcast television programs, video-on-demand (VOD) programs, audio-on-demand (AOD) programs, pay-per-view programs, IPTV (Internet Protocol Television) feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form.

System 100 introduces social networking capabilities to STBs 101a-101n by extending online social networking concepts to television delivery, whereby viewers in completely different locations can enjoy a shared viewing experience. Part of the reason for the shift from traditional television viewing to Internet browsing is the growing popularity of online social networks that connect Internet users with a potential global community of friends. Online social networks give users the feeling of being connected with a network of friends who can share interests and experiences without being physically present. In contrast, television viewing has been a more isolated experience that is shared primarily by people at the same viewing location. As a result, many users of online social networks choose Internet use over television viewing because they are reluctant to lose connection to their online community of friends when they are in front of a television.

Up to this point, online social networking and television viewing have been in direct competition for the same population of users. These two activities, however, are not mutually exclusive. Instead, social networking and television viewing complement each other, with each activity having the potential to enhance the experience of the other. There are two important elements of social networking that compliment the television viewing particularly well: (1) the feeling of being "connected" with friends and sharing experiences, without being physically present at the same location; and (2) the ability to leverage community interests and entertainment preferences. Television, in turn, can greatly enhance social networks by providing a vast content library on which to build shared experiences. Thus, a combination of the two activities provides users with a richer experience and encourages greater participation in the combined activity.

System 100 includes one or more STBs 101a-101n that use TV social networking applications 107a-107n, to implement an online social network for television viewing. Social networking applications 107a-107n can reside locally within their respective STBs 101a-101n, or in addition (or alternatively), can reside on the network side—e.g., within Internet Protocol (IP) Multimedia Subsystem (IMS) platform 105; within the IMS platform 105, this application 107 can be implemented as a software and/or hardware module (e.g., server). Social networking application 107 enables a television viewer to join or form an online community for purposes of television viewing, indicate the viewer's "television presence" (e.g., what television programming the viewer is currently watching or recording), determine what other community members are watching, provide feedback on television programs, communicate with other community members, and use community viewing habits and preferences to determine what to watch or record. In an exemplary embodiment, the viewer can access social networking functions through STBs 101a-101n or end terminal 119. As discussed earlier, end terminal 119 can include any device capable of processing AV signals for presentation to the user, such as mobile phones, desktop personal computers, workstations, web appliances, personal digital assistants (PDAs), palm computers, etc. U.S. Pat. No. As seen in FIG. 1, social networking application 107 works in conjunction with presence module 109 to determine which community members are online and what programs they are watching or recording. STBs 101a-101n or end terminal 119 send presence information over service provider network 103 and/or other available data networks (e.g., packet-based network 117 or telephony network 123) to indicate presence, status and availability. Packet-based network 117 can include the Internet. This presence information is updated periodically.

In one embodiment, social networking application 107 also provides interoperability with one or more communities contained in external online social networks 121 (e.g., FACEBOOK™ and MYSPACE™). These communities are external in a sense that they are not controlled by the service provider, and thus, are not part of the service provider's communication system. Interoperability with external online social networks 121 enables users to import existing community information and share presence/status updates and other information across networks.

To facilitate communication sessions among community members, IMS platform 105 can include communication module 111 and media server 113. These modules assist social networking application 107 to establish communication sessions among community members who are watching the same television program. These communications sessions can include instant messaging, Short Message Service (SMS), Multimedia Message Service (MMS), e-mail, voice, or video sessions depending on the capabilities of the user's media devices and preferences specified in user profile 115. In short, social networking application 107 determines the most appropriate type of communication session, communication module 111 directs the communication to the appropriate target devices, and media server 113 converts the communication and any associated media content to a format appropriate for the target device.

STBs 101a-101n and/or end terminal(s) 119 can communicate using packet-based network 117 and/or telephony network 123. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TIVO™ network, etc), and the like. Such networks may also utilize any suitable protocol supportive of data communications, e.g., transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 101a-101n to an online social network or to various sources of media content.

Although depicted in FIG. 1 as separate networks, packet-based network 117 and/or telephony network 123 may be completely or partially contained within service provider network 103. For example, service provider network 103 may include facilities to provide for transport of packet-based and/or telephony communications. As such, exemplary embodiments of social networking application 107 may, for instance, comprise hypertext markup language (HTML) user interfaces or JAVA™ applets stored on IMS platform 105 and accessed via world-wide-web pages. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing.

In particular embodiments, service provider network 103 can include media service provider 125 comprising an IPTV system configured to support the transmission of television video programs from television broadcast systems 127 as well as other content, such as media content from the various third-party sources (not illustrated) utilizing IP. That is, the IPTV system 125 may deliver signals and/or streams, including media content and social networking control commands, in the form of IP packets. Further, the transmission network (e.g., service provider network 103) may optionally support end-to-end data encryption in conjunction with the streaming and social networking.

In this manner, the use of IP permits television services to be integrated with broadband Internet services, and thus, share common connections to a user site. Also, IP packets can be more readily manipulated, and therefore, provide users with greater flexibility in terms of control, as well as offer superior methods for increasing the availability of media content. Delivery of AV content and social networking functionality, by way of example, may be through a multicast from the IPTV system 125 to the STBs 101a-101n. Any individual STB may tune to a particular source by simply joining a multicast (or unicast) of the media content or social networking control command, utilizing an IP group membership protocol (IGMP). For instance, the IGMP v2 protocol may be employed for joining STBs to new multicast (or unicast) groups. Such a manner of delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content (and subsequently the social networking control commands) may be provided to various IP-enabled devices, such as the computing, telephony, and mobile apparatuses previously delineated.

An STB (e.g., STB 101a) may integrate all the functions of an IPTV system, as well as combine the media content and control functions of the various online or off-line environments, in a manner that seamlessly toggles among the various system 100 resources. It is contemplated that the social networking service may be extended to users with a presence on the Internet. In alternative embodiments, the services of system 100 could be extended to users having an end terminal (not illustrated), such as a plain old telephone service (POTS) device, connected to the telephony network 123.

While system 100 is illustrated in FIG. 1, the exemplary components are not intended to be limiting, and indeed, additional or alternative components and/or implementations may be utilized.

Figure 2:
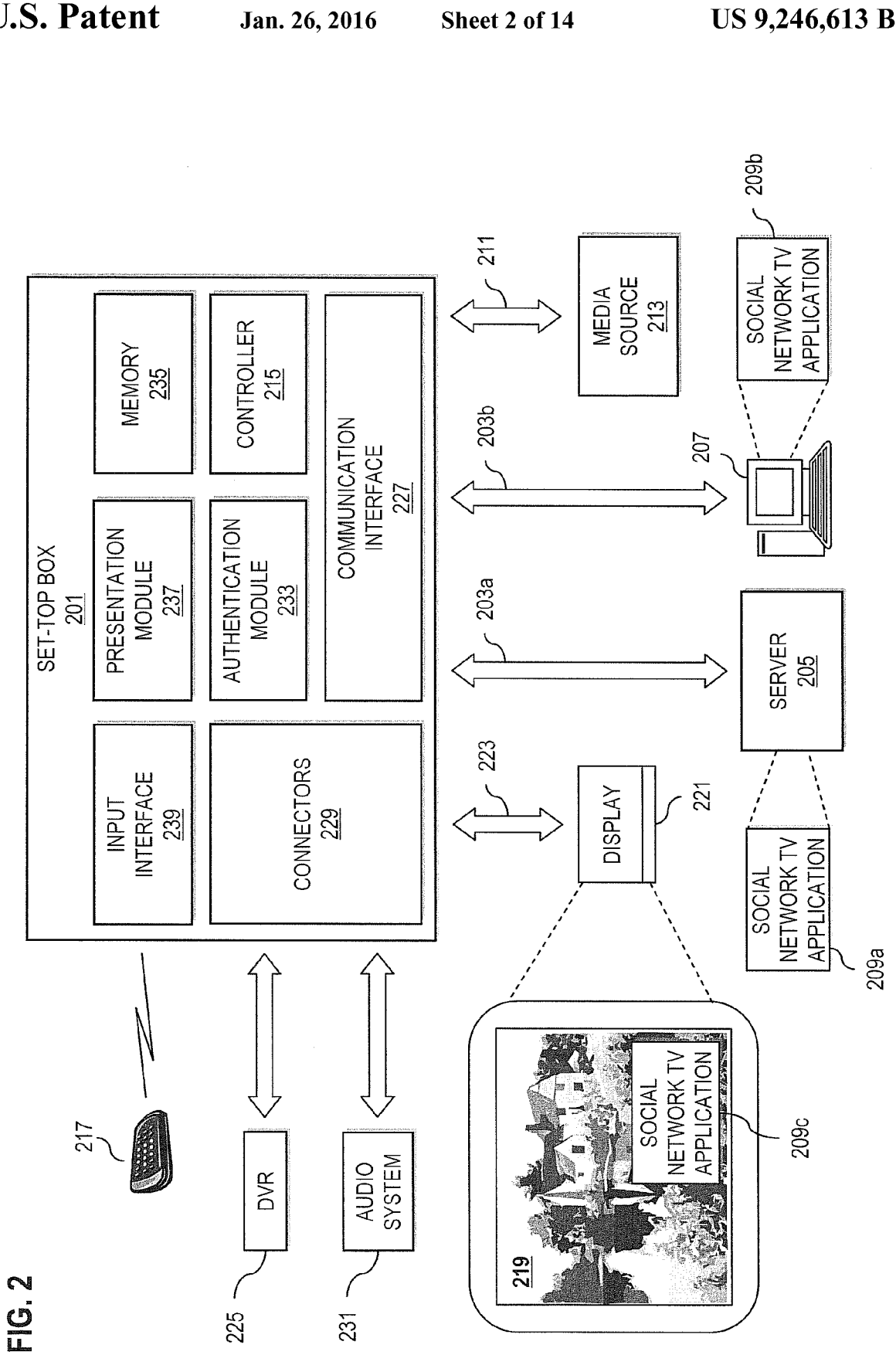
FIG. 2 is a diagram of a set-top box capable of delivering online social networking services and integrating the services with television viewing, according to an exemplary embodiment.

FIG. 2 is a diagram of a set-top box capable of delivering online social networking services and integrating the services with television viewing, according to an exemplary embodiment. STB 201 may comprise any suitable technology to receive social networking presence data and/or control commands (e.g., signals 203a and 203b) from a server 205 and/or an end terminal 207, as well as from another STB (e.g., STB 101n). The presence data and/or control commands include output from one or more social networking applications 209a-209c. STB 201 may further comprise suitable technology to receive one or more content streams 211 from a media source 213, such as the IPTV system of FIG. 1. The content stream 211 may be received in response to command(s) from social networking application(s) 209a-209c.

Accordingly STB 201 may comprise computing hardware (such as described with respect to FIG. 11) and include additional components configured to provide specialized services related to social networking and media content (e.g., remote control capabilities, conditional access functions, tuning functions, presentation functions, multiple network interfaces, AV signal ports, etc.). Alternatively, the functions and operations of STB 201 may be governed by a controller 215 that interacts with each of the STB components to configure STB 201 in response to social networking applications 209a-209c, as well as provide media content retrieved from media source 213. Additionally, a user may be afforded conventional control capabilities utilizing a control device 217.

As such, STB 201 may be configured to process data streams (e.g., streams 203a, 203b, and 211), including causing a social networking application 209c and/or one or more components of received media content (e.g., video component 219 and/or an audio component) to be presented on (or at) display 221. Presentation of the media content may be in response to a command received from social networking applications 209a-209c and include: displaying, recording, playing, rewinding, forwarding, toggling, selecting, zooming, or any other processing technique that enables users to experience media content. For instance, STB 201 may provide one or more signals 223 to a display 221 (e.g., television) so that the display 223 may present (e.g., display) social networking application 209c overlaid on the media content (e.g., video 219) to a user, wherein the social networking application 209c enables users to interact with other members of the social network or community. Alternatively, signals 223 may be configured and provided to display 221 in response to a received control command from social networking applications 209a-209c.

STB 201 may also interact with a personal video recorder (PVR), such as digital video recorder (DVR) 225, to store received media content that can then be manipulated by a user at a later point in time. In various embodiments, DVR 225 may be network-based, e.g., included as a part of the service provider network 103, collocated at a subscriber site having connectivity to STB 201, and/or integrated into STB 201. In any case, social networking applications 209a-209c may control DVR 225 to providing automatic recording functions based on community viewing habits and preferences. In alternative embodiments, STB 201 may be configured to communicate with a number of additional peripheral devices, including: PCs, laptops, PDAs, cellular phones, monitors, mobile devices, handheld devices, as well as any other equivalent technology capable of presenting content to a user, such as those computing, telephony, and mobile apparatuses described with respect to FIG. 1. These peripherals may be configured to handle social networking communication sessions and/or access content stored by STB 201 in response to control commands from social networking applications 209a-209c. For example, a media content stream 211 may be received by STB 201 and recorded by DVR 225 as the result of a received command from social networking application 209a.

Communication interface 227 may be configured to receive control commands from server 205, end terminal 207, MSP 125, or another STB (e.g., STB 101a). In turn, content streams from a media source 213 (e.g., MSP 125, television broadcast system 123, content provider system and/or repository 125), an end terminal 207, and/or server 205 may also be received at communication interface 227. In particular embodiments, communication interface 227 may optionally include single or multiple port interfaces. For example, STB 201 may establish a broadband connection to multiple sources transmitting data to STB 201 via a single port, whereas in alternative embodiments, multiple ports may be assigned to the one or more sources. In still other embodiments, communication interface 227 may transmit presence data and other social networking control commands. Further, communication interface 227 may be configured to permit users, via STB 201, to transmit other data (e.g., media content, communications, etc.) to other users with STBs, an MSP 125, or any other device, such as end terminal 207.

According to various embodiments, STB 201 may also include inputs/outputs (e.g., connectors 229) to display 221 and DVR 225, as well as an audio system 231. In particular, audio system 231 may comprise a conventional AV receiver capable of monaural or stereo sound, as well as multichannel surround sound. Audio system 231 may include speakers, ear buds, headphones, or any other suitable component configured for personal or public dissemination. As such, STB 201, display 221, DVR 225, and audio system 231, for example, may support high resolution audio and/or video streams, such as high definition television (HDTV) or digital theater systems high definition (DTS-HD) audio. Thus, STB 201 may be configured to encapsulate data into a proper format with required credentials before transmitting onto one or more of the networks of FIG. 1 and de-encapsulate incoming traffic to dispatch data to display 221 and/or audio system 231.

In an exemplary embodiment, display 221 and/or audio system 231 may be configured with IP capability (i.e., include an IP stack, or otherwise made network addressable), such that the functions of STB 201 may be assumed by display 221 and/or audio system 231 and control/configured by social networking applications 209a-209c. In this manner, an IP ready, HDTV display or DTS-HD audio system may be directly connected to one or more service provider networks 103, packet-based networks 117, and/or telephony networks 123. Although STB 201, display 221, DVR 225, and audio system 231 are shown separately, it is contemplated that these components may be integrated into a single component, or other combination of components.

An authentication module 233 may be provided at STB 201 to initiate or respond to authentication schemes of, for instance, service provider network 103 or various other content providers, e.g., broadcast television systems 127, third-party content provider systems 125, or servers 205. Authentication module 233 may provide sufficient authentication information, e.g., a user name and password, a key access number, a unique machine identifier (e.g., MAC address), and the like, as well as combinations thereof, to a corresponding network interface for establishing connectivity. Authentication information may be stored locally at memory 235, in a repository (not shown) connected to STB 201, or at a remote repository, e.g., user profile repository 115.

Authentication module 233 may also facilitate the reception of data from single or disparate sources. For instance, STB 201 may receive broadcast video from a first source (e.g., IPTV system 117 via packet-based network 109), signals from social networking applications 209a-209c at second source (e.g., IMS platform 105), and a media content stream from a third source accessible over a data network (not illustrated). As such, display 221 may present the broadcast video, social networking applications 209a-209c, and media content stream to the user. This presentation may be experienced separately, concurrently, in a toggled fashion, or with zooming, maximizing, minimizing, or trick capabilities, or equivalent mode.

A presentation module 237 may be configured to receive data streams 203a, 203b, and -211 (e.g., AV feed(s) and/or social networking control commands) and output a result via one or more connectors 229 to display 221 and/or audio system 231. In this manner, presentation module 237 may also provide a user interface for social networking application 209c via display 221. Aural aspects of social networking application 209c may be presented via audio system 231 and/or display 221. In certain embodiments, social networking application 209c may be overlaid on the video content output 219 of display 221 via presentation module 237. In any case, however, the data streams may include content received in response to user commands specifying: broadcast channels to be made available, a list of media content to be recorded, an on-demand program (e.g., VOD, AOD, etc.) to be received, or other content available over a data network to be retrieved, such as content from an audio and/or video sharing site.

Connector(s) 229 may provide various physical interfaces to display 221, audio system 231, as well as other peripherals; the physical interfaces may include, for example, RJ45, RJ11, high definition multimedia interface (HDMI), optical, coax, FireWire, wireless, and universal serial bus (USB), or any other suitable connector. The presentation module 237 may also interact with a conventional control device 217 for determining particular media content that a user desires to experience. In an exemplary embodiment, the control device 217 may comprise a remote control (or other access device having control capability, such as end terminal 207, e.g., a PC, wireless device, mobile phone, etc.) that provides a user with the ability to readily manipulate and dynamically change parameters affecting a media content experience. Such parameters can include configuration data, such as parental controls, available channel information, favorite channels specified by the user, program recording settings, viewing history, or loaded software, as well as other suitable control parameters.

In particular embodiments, configuration data may also include channel fixing options, show/hide/label channel functions, making captions or info banners available, label inputs (such as connector(s) 229) options, application graphics settings (e.g., color schemes, icons, etc.), high altitude settings, power saving modes, device password options, country/language options, display settings (e.g., AV parameters), conventional control functions (e.g., channel up/down. input, mute, pause, picture-in-picture, play, power on/off, rewind, fast-forward, record, stop, volume up/down), parental locks, application settings (e.g., memory sticks, i.links, clocks/timers, diagnostics, cable card), change operating system functions, or install software, as well as provide troubleshooting frequently asked questions, get device manuals, or receive safety tips, etc. It is generally noted that configuration data can be any option/feature available at STB 201, DVR 225, or peripheral device (e.g., display 221, audio system 231, control device 217, etc.) having connectivity to (or association with) STB 201.

In this manner, control device 217 and/or end terminal 207 may include (not shown) a cursor controller, trackball, touch screen, touch pad, keyboard, and/or a key pad for activating social networking applications 209a-209c, navigating through broadcast channels and/or media content, as well as performing other control functions and configurations. For instance, control device 217 or end terminal 207 may be utilized to maximize a social networking application, navigate through displayable interfaces, locate/specify/retrieve media content, modify STB 201 configuration data, or toggle through broadcast channels and/or available media content. Control device 217 or end terminal 207 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like. In other examples, STB 201 may be configured for voice recognition such that STB 201 may be controlled with spoken utterances entered into a remote application.

Further, the control device 217 or end terminal 207 may comprise a memory (not illustrated) for storing preferences (or configuration data) affecting the media content viewed, which can be conveyed to STB 201 through an input interface 239 (or communication interface 227). Input interface 239 may support any type of wired and/or wireless link, e.g., infrared, radio frequency (RF), BLUETOOTH, and the like. Thus, control device 217 and/or end terminal 207 may store user preferences with respect to media content, such as favorite sources, etc., as well as configuration data. Alternatively, user preferences and configuration data may be tracked, recorded, or stored in STB 201, via memory 235, or in a network user profile repository 115. The preferences and configuration data may be automatically retrieved and activated by a user at any time, or may be actuated in response to control commands received via social networking applications 209a-209c. It is noted that control device 217 may be separate from STB 201 or may be integrated within STB 201 (in which case certain input interface hardware and/or software may not be necessary).

Particular embodiments enable users, via social networking applications 209a-209c and control device 217, to populate or otherwise configure a user profile or manage subscription service options. For instance, a user profile function of social networking application(s) 209a-209c may be provided or accessed by STB 201/end terminal 207 to enable users to populate a plurality of entry fields with user information. A user profile may include one or more customized or personalized settings that affect any aspect of media content accessible via STB 201, configuration parameter of STB 201, or option of a peripheral device. More specifically, the profile may include: subscription information (account number, user name, password, security question, avatar, moniker, community, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information.

In other embodiments, profile information can include phone numbers, email addresses, workgroups, viewing history (e.g., current programming, logged history, etc.), account plan, authorized access, billing preferences (e.g., bill receipt options, such as electronic or paper bills, payment methods, such as automatic or manual, etc.), add accounts/users, parental controls, program feedback, etc. Additionally, a user profile may include a "whitelist" specifying one or more accessible media content sources/subjects, a "blacklist" specifying one or more media content sources/subjects, as well as other equivalent customized settings, such as color schemes, sound effects, etc. Still further, network settings may be affected such as registering associated STBs, DVRs, end terminals, registering premises (e.g., primary residence, vacation cottage, work, etc.), link to content sources (e.g., audio, video, and/or pictographic sites/systems/repositories, etc.), as well as other equivalent parameters.

In other embodiments, the user profile and configuration data may be established, reviewed, and/or modified using the additional access devices described earlier, e.g., end terminal 207, such as a PC, implementing or accessing social networking applications 209a-209c. As such, user profile information and configuration data may be stored in STB 201, e.g., in memory 235, and/or at a user site repository (not illustrated) directly connected to STB 201. Additionally or alternatively, this information may be stored in a network-based repository (e.g., remote user profile repository 115), control device 217, and/or any other accessible storage medium, such as a memory stick. Similarly, STB 201 (via memory 235), a user site repository, and/or a network-based repository may store a collection of digital audio, video and/or pictographic content accumulated by a user. This collection may also include a plurality of identifiers (or bookmarks) to media content established via social networking application(s) 209a-209c, wherein the selection of a particular identifier may cause the content to be retrieved from an associated link (either directly from a third party source (e.g., television broadcast systems 127, content provider system 125, etc.) or indirectly from server 205, MSP 125, end terminal 119, another STB 101a-101n, etc.).

As there may be a relatively large number of configurable parameters available to users, STB 201 may include one or more user interfaces configured to allow subscribers to seamlessly access the configurations and control parameters of one or more STBs 101a-101n and/or related social networks, via social networking applications 209a-209c. As such, media content may be made available to STBs 101a-101n via social networking applications 209a-209c. It is recognized; however, that one or more user interfaces may be implemented at one or more end terminals 207 or accessible via one or more servers 205. Thus, the user interface may be displayed to the user as part of a social networking application accessed over a suitable communications link. Namely, web pages may be displayed to the user as part of an online social networking application accessed over an Internet communications link. Exemplary processes and user interfaces for those processes are described in more detail with respect to FIGS. 3-10.

Figure 3:
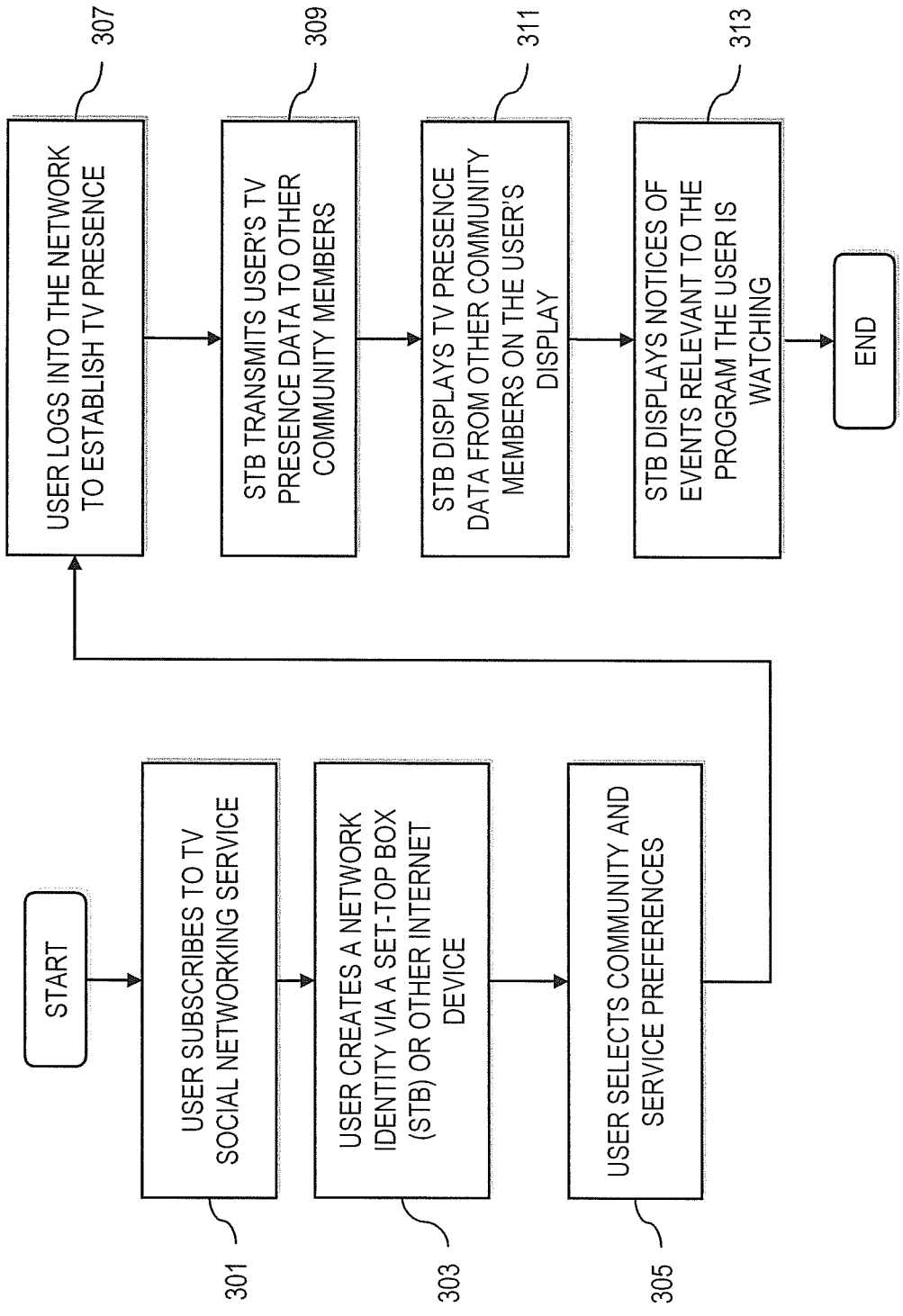
FIG. 3 is a flowchart of a process for providing online social networking for television viewing, according to an exemplary embodiment.

FIG. 3 is a flowchart of a process for providing online social networking for television viewing, according to an exemplary embodiment. This process is described with respect to an exemplary user interface of FIGS. 4A and 4B. In step 301, a new user subscribes to the social networking for television viewing service utilizing, for instance, STB 101a or end terminal 119, which is capable of processing and transmitting data over a network (e.g., packet-based network 117). That is, the user may interact with an input interface of STB 101a or end terminal 119 to activate software resident on the device, such as social networking application 107, or web-based remote application 209a implemented on server 205. The software may then establish one or more connections to a service provider network 103 through an IP-based connection. Consequently, the user may register as a new subscriber of the social networking service, as well as obtain sufficient authentication information for establishing future sessions.

In step 303, registration procedures may prompt the user to customize a user profile to embody user-defined attributes, policies, configuration data, and premises for carrying out functions of system 100. This customization process includes creating a social networking identity by choosing a screen name, password, avatar, and community (for identifying friends). Per step 305, the user specifies additional service preferences including media device capabilities, preferred form of communication (e.g., instant messaging, Short Message Service (SMS), Multimedia Message Service (MMS), e-mail, voice, or video sessions). Users also may specify configuration options such as whether to display avatars of other online community members, to record programs based on community habit and preferences automatically, to accept invitations to view or record programs automatically, and to receive alerts concerning community events.

Figure 4A:
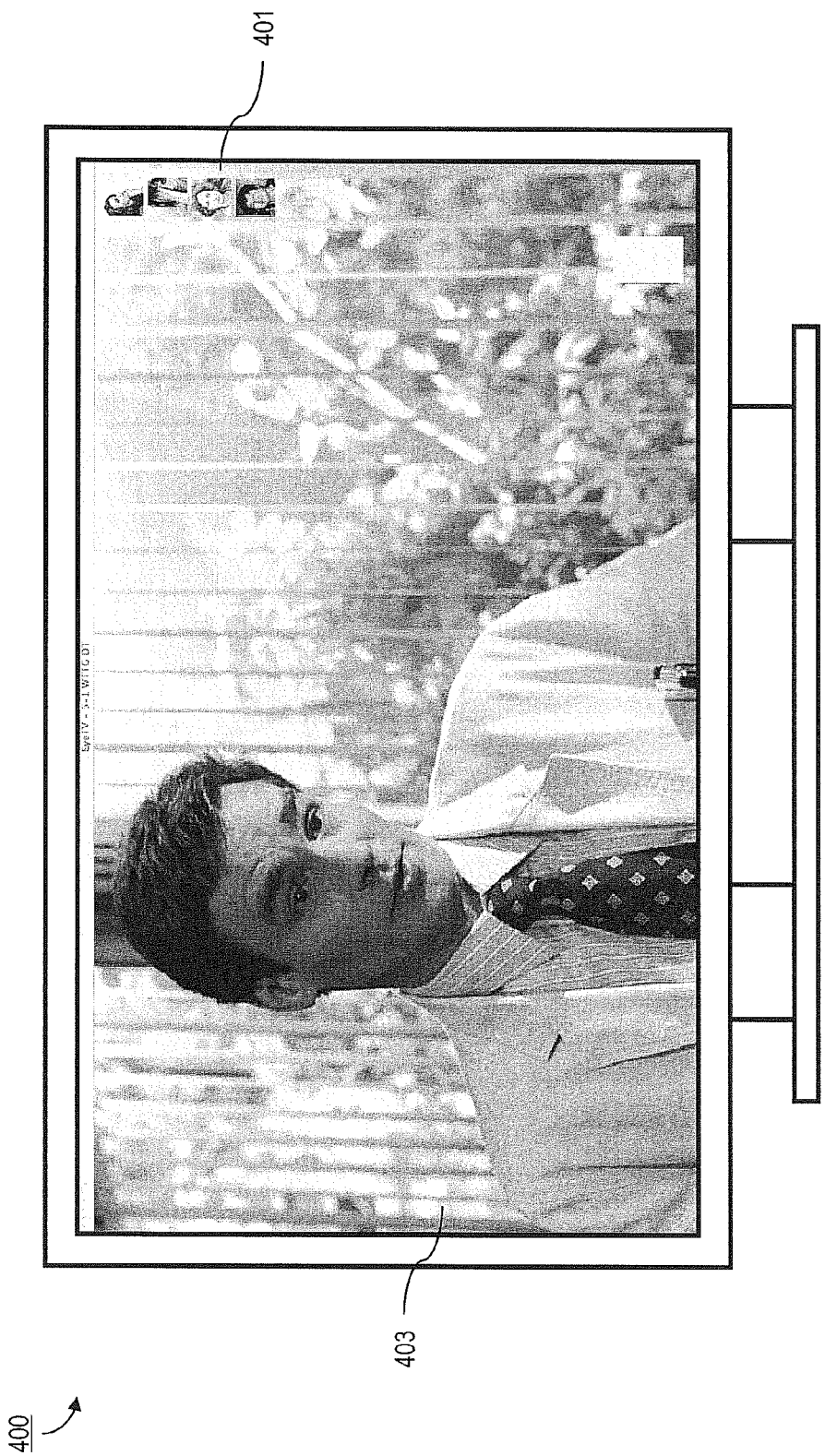
FIGS. 4A and 4B are diagrams of a user interface utilized in the process of FIG. 3, according to an exemplary embodiment.

Once registered and/or authenticated, the user logs into the network via STB 101a or end terminal 119 to establish presence in the social network, per step 307. In step 309, the log-in process also prompts STB 101a or end terminal 119 to begin transmitting presence data and status periodically to other community members through the presence module 109. In an exemplary embodiment, the presence data includes the user's availability, the television program the user is currently watching, and any feedback the user has on that programming. At the same time, the user's STB begins receiving presence data from other online members per step 311. FIG. 4A depicts a user interface 400 wherein in STB 101a displays the avatars of community members 401 watching the same program. The avatars are displayed as small transparent icons in the upper right hand corner of the screen to minimize obscuring the displayed video program 403. In an exemplary embodiment, the user may hide the avatars or change the location, transparency, or size of the avatar display. STB 101a also can also differentiate between friends who are watching the program live versus friends who are recording the program for later viewing, and display them differently.

Figure 4B:
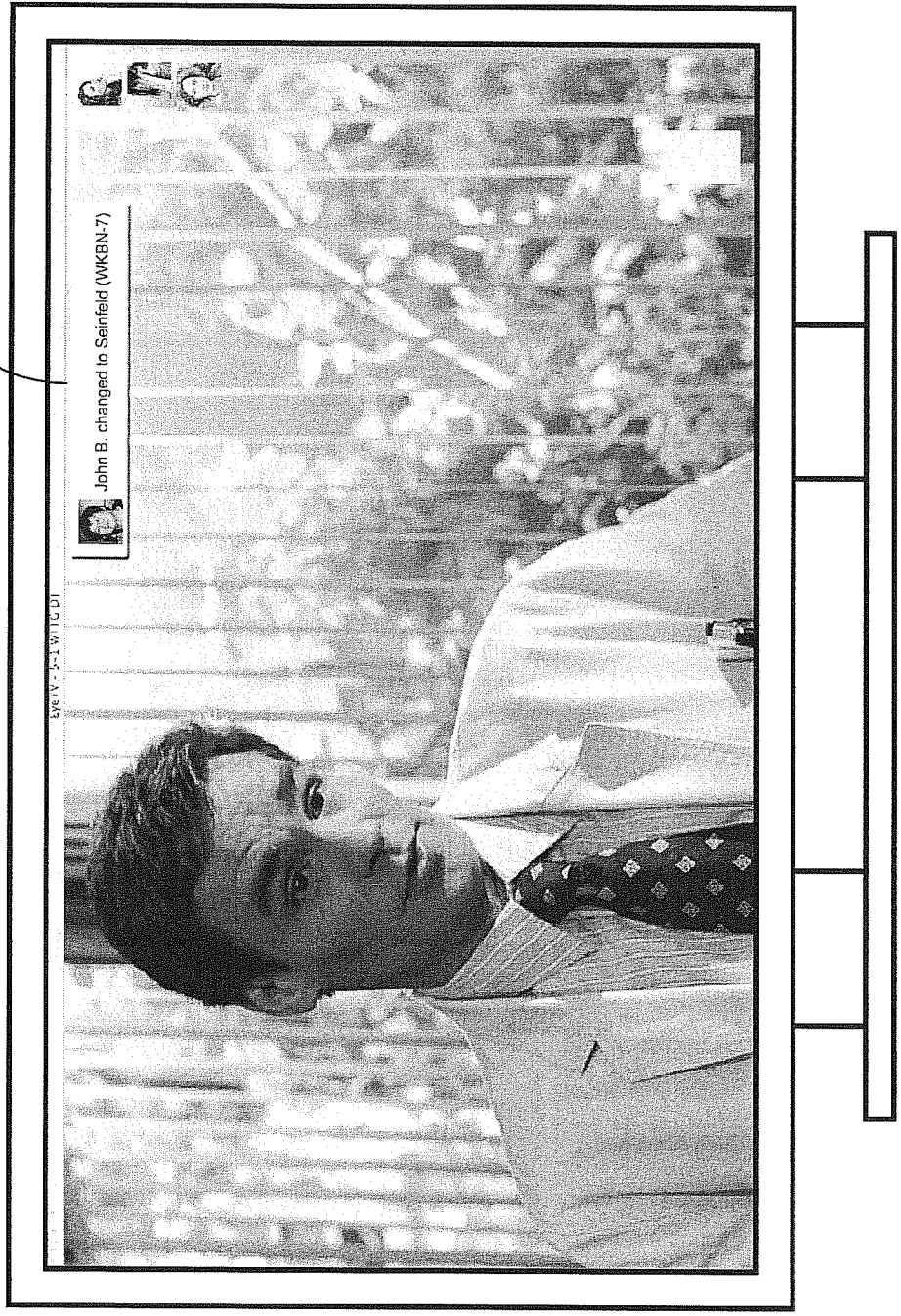

In addition, STB 101a can display events that are relevant to what the user is currently watching (e.g., friends switching to other programming or friends switching to the program that is being watched) per step 313. FIG. 4B depicts an exemplary user interface 420 wherein a small dialog box 421 is displayed announcing that a friend has changed to different programming.

Figure 5:
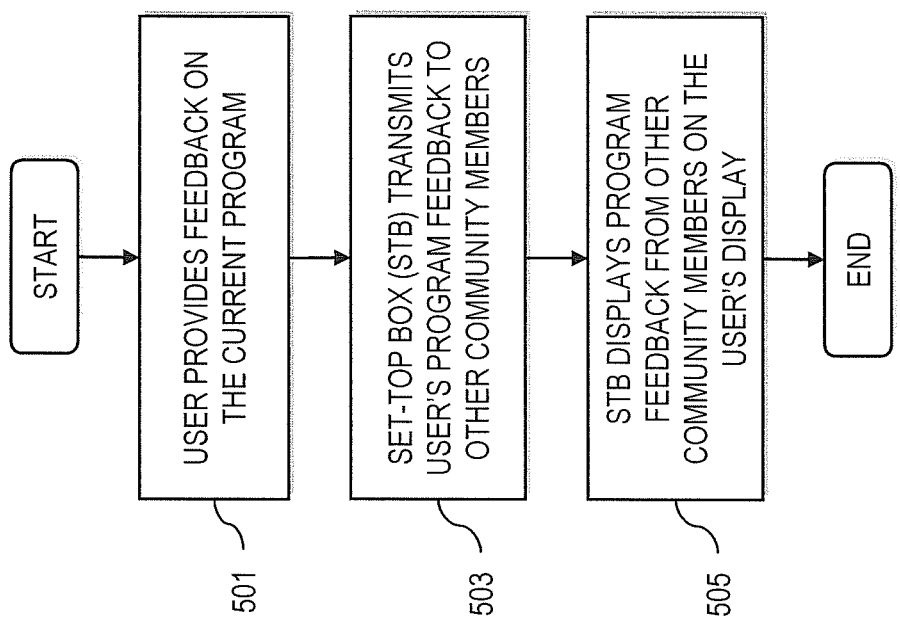
FIG. 5 is a flowchart of a process for providing feedback on television programming to an online social network, according to an exemplary embodiment.
Figure 6A:
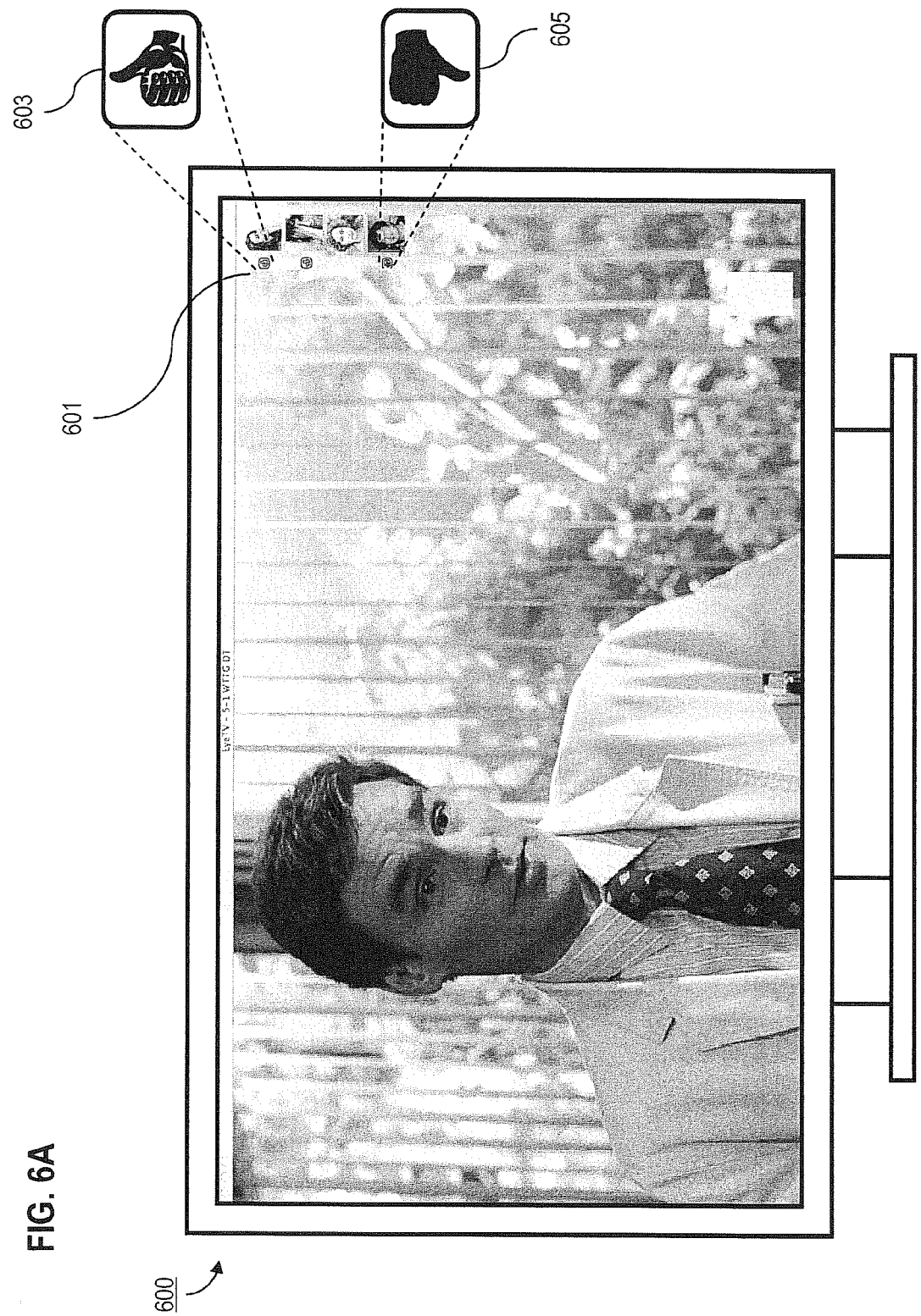
FIGS. 6A-6C are diagrams of a user interface utilized in the process of FIG. 5, according to an exemplary embodiment.
Figure 6B:
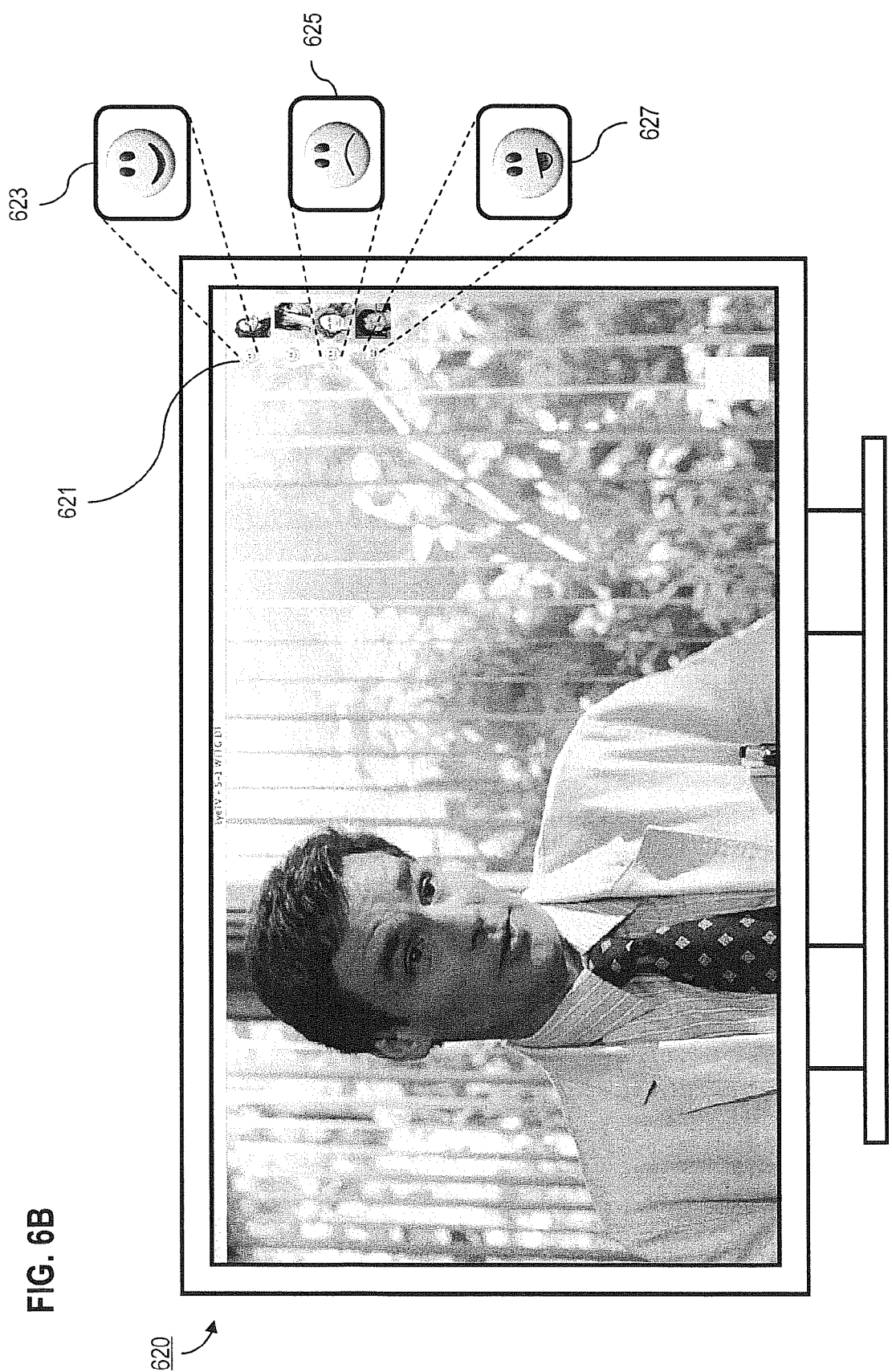
Figure 6C:
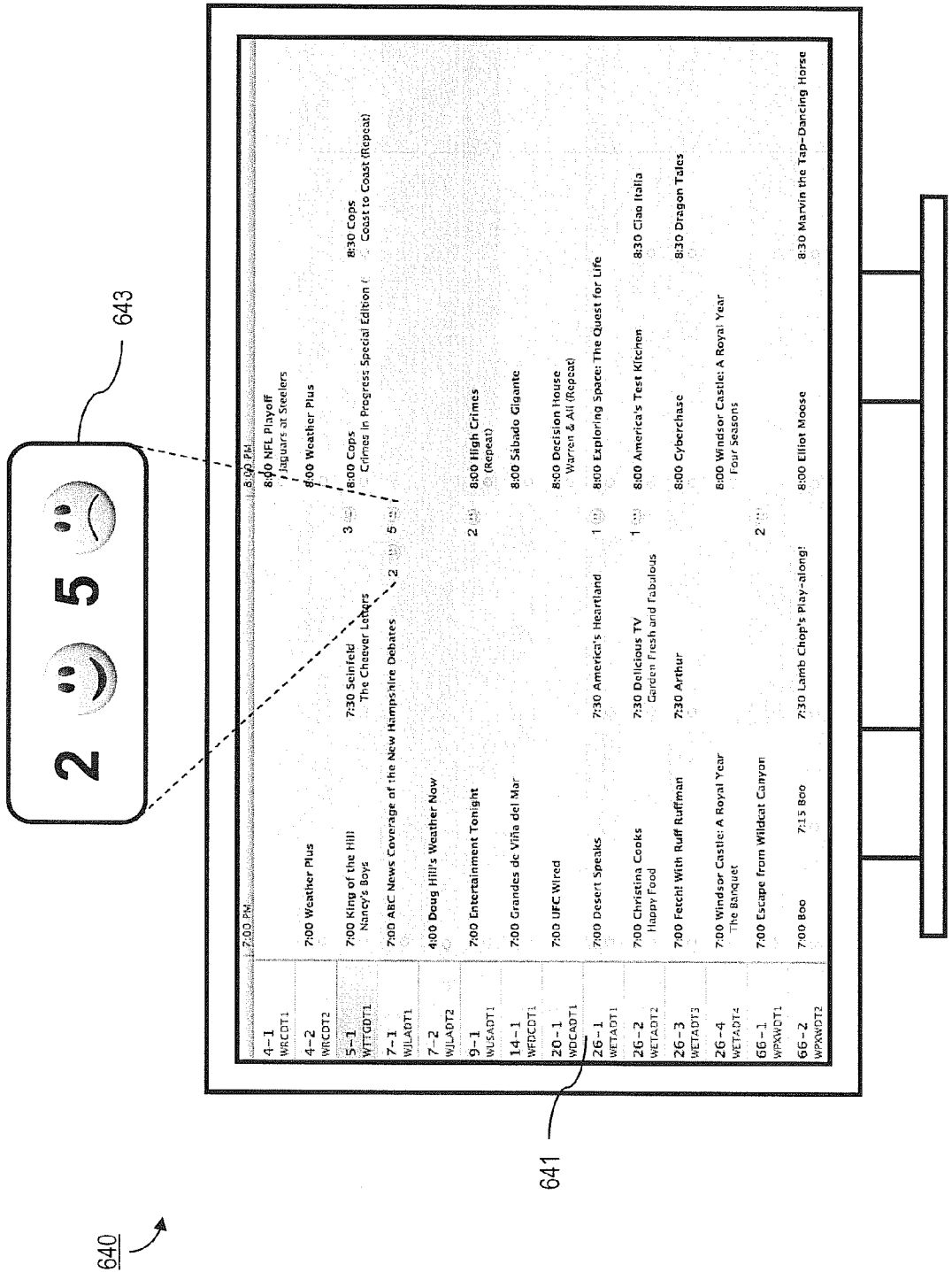

FIG. 5 is a flowchart of a process for providing feedback on television programming to an online social network, according to an exemplary embodiment. In step 501, after the user has already logged in and is viewing a program, the viewer uses an input device through STB101a or end terminal 119 to provide feedback on the program currently being viewed, as in step 503. STB101a or end terminal 119 transmits the feedback to other community members. STB101a also displays, per step 505, program feedback from other community members who are watching the show or who have already watched the show and provided feedback. It is contemplated that social networking application 107 enables users to provide a range of feedback from simple "good/bad" to fully written or even multimedia reviews. FIG. 6A depicts an exemplary user interface 600 that enables basic feedback through a "thumbs up/thumbs down" approach overlaid on the program video. In this exemplary embodiment, users can mark a program with either a "thumbs up" for good or a "thumbs down" for bad. Feedback icons 603 and 605 are enlarged representations of the feedback icons 601. FIG. 6B depicts an exemplary user interface 620 that enables a greater range of feedback via icons representing various emotions (emoticons) overlaid on program video. In this exemplary embodiment, users can mark a program with a variety of emoticons to express their feelings about a program. Feedback icons 621, among others, may include a happy icon 623, a sad icon 625, and a dislike icon 627. FIG. 6C depicts an exemplary user interface 640 that presents emoticon feedback in the program guide rather than as an overlay on top of program video. This user interface enables the user to view feedback on multiple programs in one display. In this example, program guide 641 includes emoticons along with the number of community members providing that feedback. The entry for News shows icons 643 representing two friends who liked the program, while five friends disliked the program.

Figure 7:
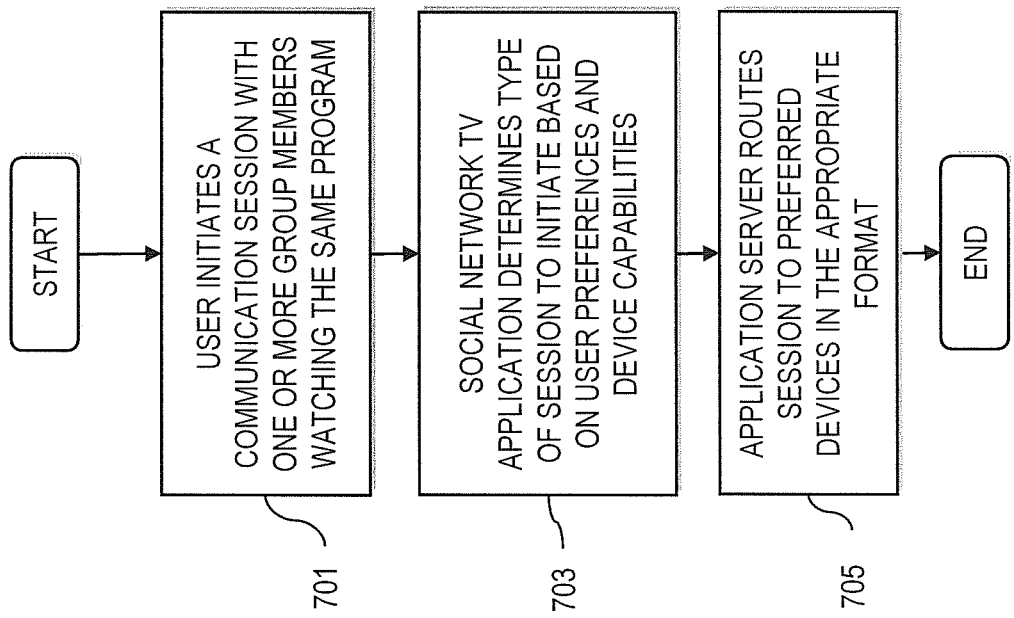
FIG. 7 is a flowchart of a process for initiating a communication session among members of an online social network for television viewing, according to an exemplary embodiment.

FIG. 7 is a flowchart of a process for initiating a communication session among members of an online social network for television viewing, according to an exemplary embodiment. While watching a program, a user can initiate a communication session with one or more group members watching the same program per step 701. In an exemplary embodiment the user can click on the avatars of a friend or friends to initiate a communication session. Social networking application 107 then determines the most appropriate form of communication based on the each participant's media device capabilities and preferences as recorded in the participant's user profile 115. In an exemplary embodiment, the user has the option to specify whether the user wants the communications session to be routed to STB 101a or an end terminal 119. The participant's user profile 115 also specifies a preferred method of communication (e.g., instant messaging, Short Message Service (SMS), Multimedia Message Service (MMS), e-mail, voice or video sessions). As discussed earlier, end terminal 119 can be a range of devices from a personal computer to a mobile phone.

In step 703, social networking application 107 determines whether the user's preferred device is capable of the desired type of communication. For example, a mobile phone may not be capable of handling a video communication session. In this case, the IMS platform 105 chooses a secondary mode of communication (e.g., voice on the mobile phone). The exemplary embodiment does not necessarily require all participants in the communication to use the same form of communication. Communication module 111 routes the session to the participant's preferred device and media server 113 converts the communication to the appropriate form for the device per step 705.

Figure 8:
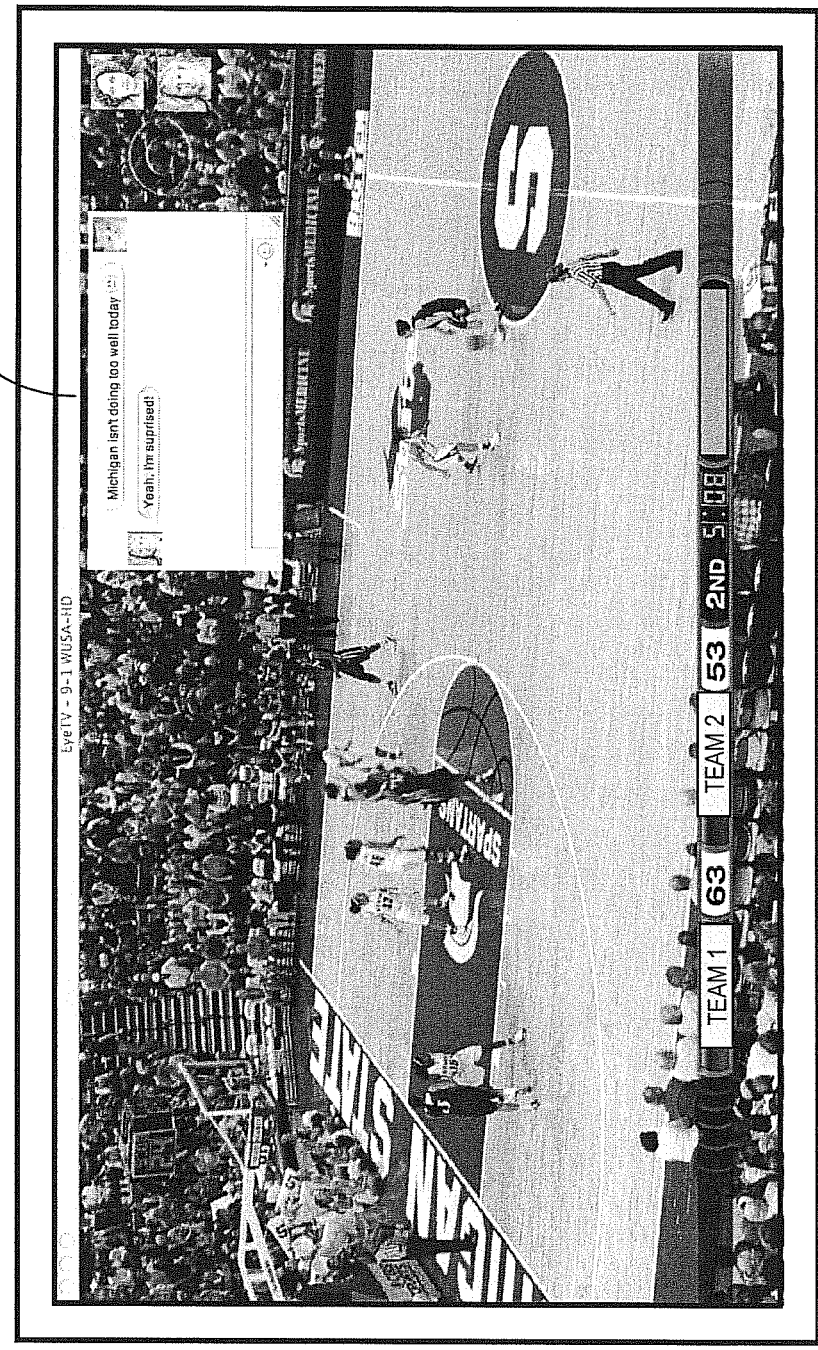
FIG. 8 is a diagram of a user interface utilized in the process of FIG. 7, according to an exemplary embodiment.

FIG. 8 depicts an exemplary user interface 800, wherein the viewer has initiated an instant messaging session with another viewer on STB101a. Instant messaging session 801 is displayed in the upper right hand corner, enabling the participants to discuss the television program.

Figure 9:
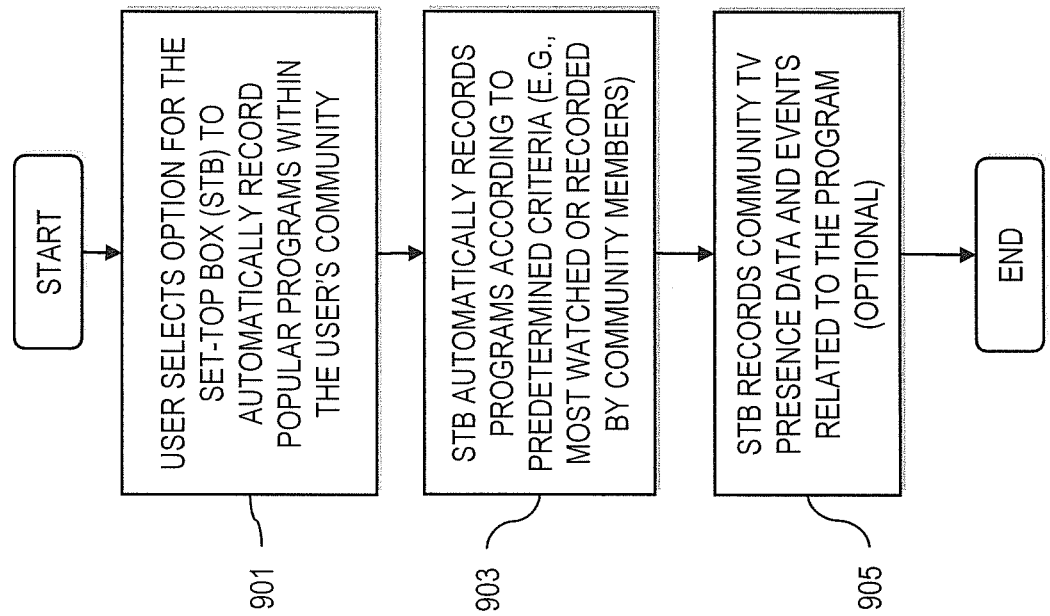
FIG. 9 is flowchart of a process for automatically recording popular television programs within an online social network for television viewing, according to an exemplary embodiment.

FIG. 9 is a flowchart of a process for automatically recording popular television programs within an online social network for television viewing, according to an exemplary embodiment. In step 901, the user configures STB 101a to automatically record programs popular in the user's community. Under this option, STB 101a will automatically record via a DVR programs that satisfy a predetermined criteria (e.g., as specified by the user), per step 903; the criteria can specify programs that are most watched or recorded by a specified number of community members. STB 101a will initiate the recording only when the user is not already viewing the program and when STB resources (e.g., tuner and disk space capacity) are available. The user can specify the threshold number of members before STB 101a automatically initiates a recording. Alternatively, the user also can specify that related community presence data and events be recorded with the program, as in step 905. Although the exemplary embodiment contemplates automatic recording based on the number of members watching or recording a program, it is envisioned that a variety of recording criteria can be used to initiate recording such as favorable program feedback or recording by a trusted friend.

Figure 10:
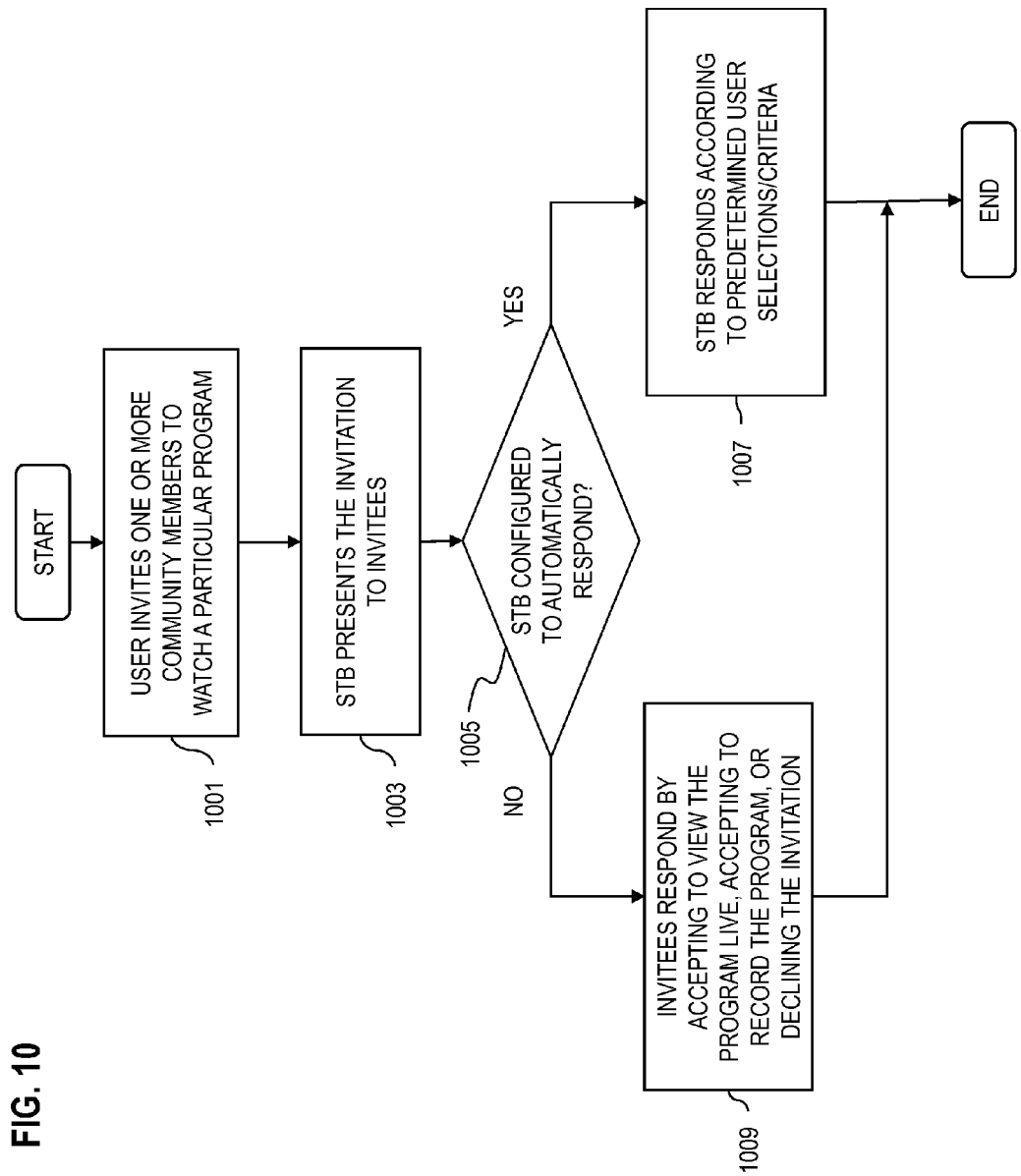
FIG. 10 is a flowchart of a process for inviting members of an online social network for television viewing to view a particular program, according to an exemplary embodiment.

FIG. 10 is a flowchart of a process for inviting members of an online social network to view a particular program, according to an exemplary embodiment. In step 1001, a user invites one or more community members via STB 101a or end terminal 119 to watch a particular program. Invitations are displayed on the program guide of the invitees' STBs per step 1003. Displaying invitations in the program guide enables invitees to quickly determine whether they are available to view the offered program and provide a response under step 1005.

In an exemplary embodiment, the user can configure STB 101a to automatically accept invitations from community members designated as "best friends" or equivalent, record invitations from community members designated as "OK friends" or equivalent, and decline invitations from community members designated as "blocked friends" or equivalent. The user has the option to manually override automatic invitation responses. Consequently, the process determines, as in step 1005, whether the user has configured the STB 101a for automatic invitation responses. If such a feature is invoked, the STB 101a can respond according to the selections/criteria provided by the user, as in step 1007.

However, if no automatic response is set, the invitees can respond, as in step 1009, in one of three ways: (1) accept the invitation to view the program live; (2) accept the invitation to record the show, in which case the recording also will include all community events related to the program (e.g., program feedback, instant messaging chat logs, e-mail transcripts, etc.); or (3) decline the invitation.

By way of example, the invitation concept can be extended to specific communities such as an educational community. In this case, a professor can invite all students in his Political Science class to watch a Presidential debate. Following the debate, the professor can moderate a media session employing voice, video, and instant messaging to discuss the debate. The media session can include the capability to rebroadcast relevant portions of the program to the class.

The described processes, according to certain embodiments, extends social networking concepts to television viewing by allowing viewers to determine what their friends are watching, interact with their friends that are watching the same programming, and use friends' viewing habits and preferences to determine what to watch.

The processes described herein for providing online social networking for television viewing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
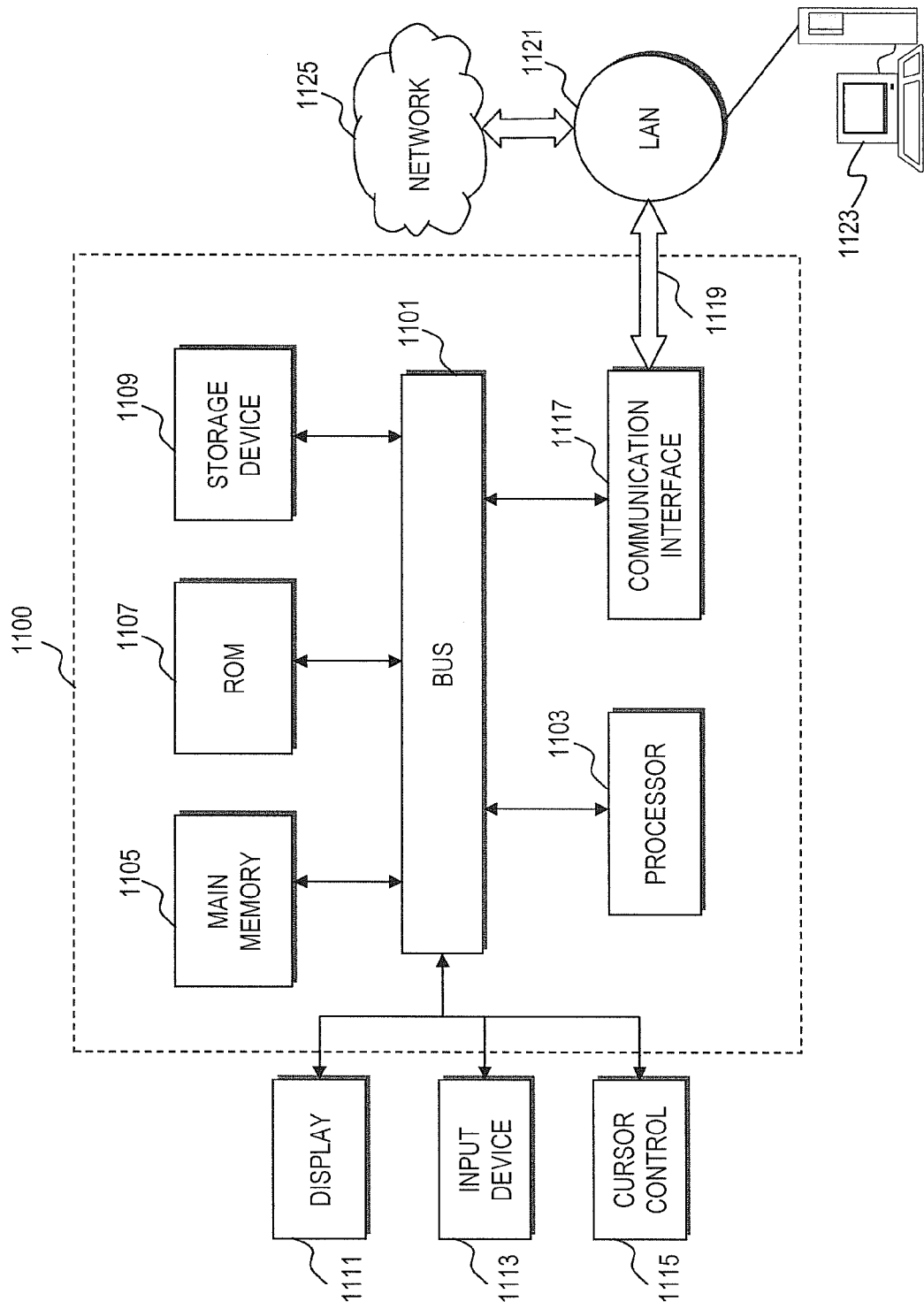
FIG. 11 is a diagram of a computer system that can be used to implement various exemplary embodiments.

FIG. 11 illustrates computing hardware (e.g., computer system) 1100 upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining a community of a plurality of friends of one user, each of the friends being logged in a corresponding device configured to present live audio-video content, wherein the community of the plurality of friends is defined by one or more social networks of the user;
   determining presence information and feedback on a program within the audio-video content of each one of the friends in the community associated with the audio-video content, wherein the feedback includes a positive feedback symbol, a count of positive feedback on the program among the friends, a negative feedback symbol, a count of negative feedback on the program among the friends, and each of the counts is more than one and excludes feedback of the user;
   embedding the feedback in program guide information;
   transmitting the program guide information embedded with the feedback to a device of the user corresponding device of another one of the friends;
   causing, at least in part, a presentation of a program guide on the corresponding device based on the program guide information while the device and the corresponding device are playing the program, the presentation displaying the feedback within programming information of the program guide; and
   causing, at least in part, updating the presentation of the program guide on the corresponding device based on one or more changes to the feedback while the device and the corresponding device are playing the program, wherein the one or more changes to the feedback are made while the device and the corresponding device are playing the program.

2. A method according to claim 1, further comprising:
   while the corresponding device is playing the program, causing, at least in part, updating the presentation of the program on the corresponding device based on one or more changes to the presence information, the feedback, or a combination thereof, associated with the device,
   wherein the one or more social networks include one or more external online social networks.

3. A method according to claim 2, further comprising:
   establishing a communication session between the one friend and the other friend during the presentation of the audio-video content,
   wherein a type of the communication session is selected from one of an instant messaging session, Short Message Service (SMS), Multimedia Message Service (MMS), electronic mail, a voice session, or a video session based on a determination of capabilities of devices of the one friend and the other friend.

4. A method according to claim 3, further comprising:
   transmitting information about the audio-video content the one friend is watching to the corresponding device.

5. A method according to claim 4, further comprising:
   while the device is playing the program, recording the program in the device with the presence information and the feedback, without user intervention, based on one or more criteria predetermined by the one friend; and
   transmitting the presence information of the one friend on the audio-video content to the corresponding device,
   wherein the one or more criteria specify the program as most watched or recorded by a threshold number of the friends, as a favorable program watched or recorded by one or more predetermined friends, or a combination thereof.

6. A method according to claim 4, further comprising:
   causing, at least in part, a presentation of the program on the corresponding device based on a friend selection of the program in the program guide, the presentation displaying an avatar of the one friend, the feedback, or a combination thereof, overlaying the program,
   wherein the corresponding device is configured to automatically record the audio-video content.

7. A method according to claim 6, wherein the avatar is a thumbnail image of the one friend, and the automatic recording is based on community presence information.

8. A method according to claim 3, further comprising:
   transmitting an invitation of the one friend to the one or more other friends in the community to watch the audio-video content,
   wherein each of the devices of the invited friends is configured to automatically respond to the invitation according to a predetermined criterion associated with the one friend, and the automatic response is overridden to permit a manual response to the invitation with one of acceptance to watch the audio-video content, acceptance to record the audio-video content, or refusal of the invitation.

9. A method according to claim 1, further comprising:
   transmitting an invitation of the one friend to one or more of the other friends in the community to watch the audio-video content,
   wherein each of the devices of the invited friends is configured to automatically respond to the invitation according to a predetermined criterion associated with the respective friend, the association of the predetermined criterion with the respective friend is preconfigured in the device by the respective friend, and the criterion specifies a characteristic of the respective friend.

10. A method according to claim 1, further comprising:

transmitting an invitation of the one friend to one or more of the other friends in the community to watch the audio-video content, wherein each of the devices of the invited friends is configured to automatically respond to the invitation according to a predetermined criterion associated with the respective friend, and the automatic response comprises initiation of a function of the responding device that corresponds with the predetermined criterion associated with the respective friend.

11. An apparatus comprising:

a processor configured to execute, a social networking module configured to determine a community of a plurality of friends of one user, each of the friends being logged in a corresponding device configured to present live audio-video content, wherein the community of the plurality of friends is defined by one or more social networks of the user;

a presence module configured to determine presence information and feedback on a program within the audio-video content of each one of the friends in the community associated with the audio-video content, and configured to embed the feedback in program guide information, wherein the feedback includes a positive feedback symbol, a count of positive feedback on the program among the friends, a negative feedback symbol, a count of negative feedback on the program among the friends, and each of the counts is more than one and excludes feedback of the user;

a communication module configured to transmit the program guide information embedded with the feedback to a device of the user;

a presentation module configured to cause, at least in part, a presentation of a program guide on the device based on the program guide information while the device and the corresponding device are playing the program, the presentation displaying the feedback within programming information of the program guide; and a updating module configured to cause, at least in part, updating the presentation of the program guide on the corresponding device based on one or more changes to the feedback while the device and the corresponding device are playing the program, wherein the one or more changes to the feedback are made while the device and the corresponding device are playing the program.

12. An apparatus according to claim 11, wherein the one or more social networks include one or more external online social networks.

13. An apparatus according to claim 11, wherein the communication module is further configured to establish a communication session between the one friend and the other friend during the presentation of the audio-video content, wherein a type of the communication session is selected from one of an instant messaging session, Short Message Service (SMS), Multimedia Message Service (MMS), electronic mail, a voice session, or a video session based on a determination of capabilities of devices of the one friend and the other friend.

14. An apparatus according to claim 11, wherein the communication module is further configured to transmit information about the audio-video content the one friend is watching to the corresponding device.

15. An apparatus according to claim 14, further comprising:

a recording module configured to record a presentation of the presence information within a presentation of the audio-video content when recording the audio-video content, wherein the communication module is further configured to transmit the presence information of the one friend on the audio-video content to the corresponding device.

16. An apparatus according to claim 14, wherein the corresponding device is configured to automatically record the audio-video content.

17. An apparatus according to claim 16, wherein the automatic recording is based on community presence information.

18. An apparatus according to claim 11, wherein the processor is further configured to:

transmit an invitation of the one friend to one or more of the other friends in the community to watch the audio-video content, wherein each of the devices of the invited friends is configured to automatically respond to the invitation according to a predetermined criterion associated with the one friend, and the automatic response is overridden to permit a manual response to the invitation with one of acceptance to watch the audio-video content, acceptance to record the audio-video content, or refusal of the invitation.

19. An apparatus according to claim 11, wherein the communication module is further configured to transmit an invitation of the one user to one or more of the other users in the community to watch the audio-video content, each of the devices of the invited friends is configured to automatically respond to the invitation according to a predetermined criterion associated with the respective friend, the association of the predetermined criterion with the respective friend is preconfigured in the device by the respective friend, and the criterion specifies a characteristic of the respective friend.

20. An apparatus according to claim 11, wherein the processor is further configured to:

transmit an invitation of the one friend to one or more of the other friends in the community to watch the audio-video content, wherein each of the devices of the invited friends is configured to automatically respond to the invitation according to a predetermined criterion associated with the respective friend, and the automatic response comprises initiation of a function of the responding device that corresponds with the predetermined criterion associated with the respective friend.

21. A method comprising:

joining, by a set-top box, a community of set-top boxes that are configured to present live audio-video content;

receiving, at the set-top box, presence information and feedback on a program within the audio-video content of friends of a user of the set-top box, wherein the feedback is embedded in program guide information, wherein the friends are defined by one or more social networks of the user, wherein the feedback includes a positive feedback symbol, a count of positive feedback on the program among the friends, a negative feedback symbol, a count of negative feedback on the program among the friends, and each of the counts is more than one and excludes feedback of the user;

presenting, at the set-top box, the program guide information embedded with the feedback for the user;

transmitting, from the set-top box, an invitation of the user to some of the friends in the community to watch the audio-video content;

causing, at least in part by the set-top box, a presentation of a program guide on corresponding devices of the some friends based on the program guide information while the device and the corresponding device are playing the program, the presentation displaying the feedback within programming information of the program guide; and causing, at least in part by the set-top box, updating the presentation of the program guide on the corresponding devices based on one or more changes to the feedback while the device and the corresponding devices are playing the program, wherein the one or more changes to the feedback are made while the device and the corresponding devices are playing the program, wherein each of the devices of the invited friends is configured to automatically respond to the invitation according to a predetermined criterion associated with the respective friend, wherein the association of the predetermined criterion with the respective friend is preconfigured in the device by the respective friend.

22. A method according to claim 21, further comprising:
initiating a communication session with one of the friends during the presentation of the audio-video content, wherein a type of the communication session is selected from one of an instant messaging session, Short Message Service (SMS), Multimedia Message Service (MMS), electronic mail, a voice session, or a video session based on a determination of capabilities of devices of the user and the one friend.

23. A method according to claim 21, further comprising:
receiving additional feedback from the user on the audio-video content; and
transmitting the additional feedback to one or more of the set-top boxes for presentation to the friends.

24. A set-top box apparatus comprising:
a processor configured to join a community of set-top boxes that are configured to present live audio-video content;
a communication interface configured to receive presence information and feedback on a program within the audio-video content of friends of a user of the set-top box, wherein the feedback is embedded in program guide information, wherein the friends are defined by one or more social networks of the user, wherein the feedback includes a positive feedback symbol, a count of positive feedback on the program among the friends, a negative feedback symbol, a count of negative feedback on the program among the friends, and each of the counts is more than one and excludes feedback of the user;
a presentation module configured to the present the program guide information embedded with the feedback for the user, and to transmit an invitation of the user to one or more of the friends in the community to watch the audio- video content, wherein the presentation module is further configured to cause, at least in part, a presentation of the program guide on the corresponding device based on the program guide information while the device and the corresponding device are playing the program, the presentation displaying the feedback within programming information of the program guide; and
a updating module configured to cause, at least in part, updating the presentation of the program guide on the corresponding device based on one or more changes to the feedback while the device and the corresponding device are playing the program, wherein the one or more changes to the feedback are made while the device and the corresponding device are playing the program,
wherein each of the devices of the invited friends is configured to automatically respond to the invitation according to a predetermined criterion associated with the respective friend, wherein the association of the predetermined criterion with the respective friend is preconfigured in the device by the respective friend.

25. An apparatus according to claim 24, wherein the communication interface is further configured to initiate a communication session with one of the friends during the presentation of the audio-video content, wherein a type of the communication session is selected from one of an instant messaging session, Short Message Service (SMS), Multimedia Message Service (MMS), electronic mail, a voice session, or a video session based on a determination of capabilities of devices of the user and the one friend.

26. An apparatus according to claim 24, further comprising:
an input interface configured to receive additional feedback from the user on the audio-video content, wherein the additional feedback is transmitted to one or more of the set-top boxes for presentation to the friends.

* * * * *